US008481194B2

(12) United States Patent
Kim (10) Patent No.: US 8,481,194 B2
(45) Date of Patent: Jul. 9, 2013

(54) RECHARGEABLE BATTERY AND BATTERY MODULE USING THE SAME

(75) Inventor: Tae-Yong Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 782 days.

(21) Appl. No.: 12/654,043

(22) Filed: Dec. 8, 2009

(65) Prior Publication Data

US 2010/0143786 A1  Jun. 10, 2010

(30) Foreign Application Priority Data

Dec. 8, 2008  (KR) ........................ 10-2008-0124112

(51) Int. Cl.
*H01M 2/20*  (2006.01)
(52) U.S. Cl.
USPC ............................ 429/123; 429/178; 429/183
(58) Field of Classification Search
USPC .......................................... 429/123, 178, 183
See application file for complete search history.

(56) References Cited

U.S. PATENT DOCUMENTS

| | | | | |
|---|---|---|---|---|
| 4,385,100 A | * | 5/1983 | Hooke et al. .................. | 429/183 |
| 7,205,068 B2 | * | 4/2007 | Fong et al. ................ | 429/178 X |
| 7,306,877 B2 | * | 12/2007 | Fujii et al. ................. | 429/178 X |
| 7,393,608 B2 | * | 7/2008 | Cho ........................... | 429/178 X |
| 7,556,533 B2 | * | 7/2009 | Seo ............................ | 429/121 X |

FOREIGN PATENT DOCUMENTS

| | | |
|---|---|---|
| JP | 06-243849 | 9/1994 |
| JP | 10-261399 | 9/1998 |
| JP | 11-162521 | 6/1999 |
| JP | 2000-243378 | 9/2000 |

\* cited by examiner

*Primary Examiner* — Stephen J. Kalafut
(74) *Attorney, Agent, or Firm* — Robert E. Bushnell, Esq.

(57) ABSTRACT

A rechargeable battery includes an electrode group for producing electricity, a case for housing the electrode group, a cap plate combined with the case, an electrode terminal electrically coupled to the electrode group, and a fixing member disposed inside the case and combined to the support shaft portion. The electrode terminal includes a head portion disposed outside the case, and a support shaft portion protruding from the head portion and penetrating the cap plate. Contact resistance of the rechargeable battery can be reduced with this configuration. A battery module includes a plurality of rechargeable batteries and bus bars electrically connecting at least two of the rechargeable batteries, wherein each rechargeable battery includes a case with an internal space, a cap plate combined with the case, an electrode terminal including a head portion caught on the cap plate and a support shaft portion protruding from the head portion and penetrating the cap plate, and a fixing member disposed inside the case and combined to the support shaft portion.

24 Claims, 8 Drawing Sheets

RECHARGEABLE BATTERY AND BATTERY MODULE USING THE SAME

CLAIM OF PRIORITY

This application makes reference to, incorporates the same herein, and claims all benefits accruing under 35 U.S.C. §119 from an application earlier filed in the Korean Intellectual Property Office on 8 Dec. 2008 and there duly assigned Serial No. 10-2008-0124112.

BACKGROUND OF THE INVENTION

1. Field of the Invention

The present invention relates to a rechargeable battery and a battery module, and more particularly, to a rechargeable battery having an improved structure for electrically connecting electrode terminals and rechargeable batteries, and a battery module.

2. Description of the Related Art

Unlike a primary battery that cannot be recharged, a rechargeable battery (i.e., secondary battery or a secondary cell) can be repeatedly charged and discharged. A low capacity rechargeable battery is used for small electronic devices such as mobile phones, notebook computers, camcorders, and the like, and a large-capacity rechargeable battery is commonly used as a power source for driving a motor of a hybrid electric vehicle and the like.

Recently, a high output rechargeable battery using a non-aqueous electrolyte with high energy density has been developed, and it is formed as a large-capacity rechargeable battery configured by connecting a plurality of rechargeable batteries in series so as to be used for driving a motor of a device, i.e., an electric vehicle, and the like, that requires high power. In addition, a single large-capacity rechargeable battery generally includes a plurality of rechargeable batteries connected in series. The rechargeable battery may have a cylindrical or angular shape.

The angular rechargeable battery includes an electrode group (i.e., an electrode assembly) including a positive electrode and a negative electrode positioned with a separator interposed therebetween, a case with a space for housing the electrode group, and a cap plate for sealing the case and having a terminal hole into which an electrode terminal is inserted, the electrode terminal being electrically connected with the electrode group and inserted into the terminal hole so as to outwardly protrude from the case.

The rechargeable batteries are electrically connected by a connection plate to constitute a battery module. The electrode terminal is fixed to the cap plate by a nut combined at an upper portion of the electrode terminal, the connection plate is fastened on the nut, and a nut is fastened to the connection plate, whereby the connection plate and the electrode terminal are electrically connected. The fastening force of the nut needs to be strengthened to reduce contact resistance between the electrode terminal and the connection plate. In particular, the fastened nut may become loose due to vibration transferred to the rechargeable battery, and in this case, in order to prevent an increase in the contact resistance, the nut should be tightened strongly.

The electrode terminal serves as a passage of current, so it is preferably made of a material of good electrical conductivity. In general, the positive electrode terminal is made of aluminum, while the negative electrode terminal is made of copper.

Copper and aluminum are weak so there is a limitation in increasing the fastening force of the nut. Thus, when vibration, temperature change, an impact, or the like occurs, in many cases the nut loosens and the contact resistance increases.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention is made in an effort to provide a rechargeable battery having advantages of reducing contact resistance.

An exemplary embodiment of the present invention provides a rechargeable battery including an electrode group including a positive electrode, and a negative electrode, and a separator disposed between the positive electrode and the negative electrode, a case for housing the electrode group, a cap plate combined with the case, an electrode terminal electrically coupled to the electrode group, and a fixing member disposed inside the case and combined to the support shaft portion. The electrode terminal includes a head portion disposed outside the case and a support shaft portion protruding from the head portion and penetrating the cap plate.

The rechargeable battery may further include an auxiliary connection member mechanically coupled to the head portion of the electrode terminal. The auxiliary connection member includes a flange portion and a connection shaft portion protruding from the flange portion. The support shaft portion may include a threaded face, and the fixing member may be formed as a nut. A terminal hole may be formed on the cap plate, the support shaft portion may be inserted into the terminal hole.

The head portion may include a space inside the head portion. A side surface of the head portion has a side opening into the space, and an upper surface of the head portion has an upper opening into the space.

The flange portion may be disposed inside the space of the head portion, and the connection shaft portion may protrude out of the head portion through the upper opening. One side of the upper opening may have a cutout connecting the upper opening to the side opening, and another side of the upper opening may be formed to fit the connection shaft portion.

The head portion may have a space inside the head portion, and an upper surface of the head portion may have an upper opening into the space. A first side surface of the head portion may have a first side opening into the space, and a second side surface of the head portion may have a second side opening into the space. A first side of the upper opening may have a first cutout connecting the upper opening to the first side opening, and a second side of the upper opening may have a second cutout connecting the upper opening to the second side opening. A size of the first cutout may be greater than a size of the second cutout.

The head portion may have a space inside the head portion, and an upper surface of the head portion may have an upper opening into the space. A first side surface of the head portion may have a first side opening into the space, a second side surface of the head portion may have a second side opening into the space, and a third side of the head portion may have a third side opening into the space. A first side of the upper opening may have a cutout connecting the upper opening to the first side opening.

Another embodiment of the present invention provides a battery module including a plurality of rechargeable batteries and bus bars electrically connecting at least two of the rechargeable batteries. Each rechargeable battery includes a case for housing an electrode group that produces electricity, a cap plate combined with the case, an electrode terminal electrically coupled to the electrode group, and a fixing member disposed inside the case and combined to the support shaft portion. The electrode terminal includes a head portion disposed outside the case, and a support shaft portion protruding from the head portion and penetrating the cap plate.

The rechargeable battery may further include an auxiliary connection member mechanically coupled to the head portion of the electrode terminal. The auxiliary connection member includes a flange portion and a connection shaft portion protruding from the flange portion. The connection shaft portion may penetrate the bus bar, and the battery module may further include a pressing member installed to the connection shaft portion to tightly attach the bus bar to the electrode terminal.

An outer surface of the connection shaft portion may have a threaded face, and the pressing member may be formed as a nut. The bus bar may be fixed to the head portion through welding.

The support shaft portion may include a threaded face, and the fixing member may be formed at a nut fastened to the support shaft portion, a terminal hole may be formed at the cap plate, and the support shaft portion may be inserted into the terminal hole.

The head portion may have a space inside the head portion. A side surface of the head portion may have a side opening into the space, and an upper surface of the head portion may have an upper opening into the space. The flange portion may be disposed inside the space of the head portion, and the connection shaft portion may protrude out of the head portion through the upper opening.

One side of the upper opening may have a cutout connecting the upper opening to the side opening, and another side of the upper opening may be formed to fit the connection shaft portion.

The head portion may have a space inside the head portion. An upper surface of the head portion may have an upper opening into the space, a first side surface of the head portion may have a first side opening into the space, and a second side surface of the head portion may have a second side opening into the space. The first side opening may face the second side opening. A first side of the upper opening may have a first cutout connecting the upper opening to the first side opening, and a second side of the upper opening may have a second cutout connecting the upper opening to the second side opening. A size of the first cutout nay be greater than a size of the second cutout.

The head portion may have a space inside the head portion. An upper surface of the head portion may have an upper opening into the space, The head portion may have at least three side openings formed at side surfaces of the head portion, and the at least three side openings being connected.

The auxiliary connection member may be formed to have greater mechanical strength than the electrode terminal.

According to embodiments of the present invention, the head portion is positioned on the cap plate, the support shaft portion is inserted into the case through the cap plate, and the fixing member is combined to the support shaft portion to allow the head portion and the fixing member to fix the electrode terminal from both sides of the cap plate, thereby stably fixing the electrode terminal to the cap plate.

Because the fixing member is positioned at the inner side of the case, the fixing member can be prevented from being loosened due to vibration, impact, or the like. This is because vibration or impact cannot be directly transferred to the interior of the case, and in addition, the vibration or the impact is absorbed owing to a gasket and an insulating member.

A part of the auxiliary connection member is inserted into the head portion. The electrode terminal is made of a material with higher electrical conductivity and the auxiliary connection member is made of a material with better mechanical strength compared with the electrode terminal. Therefore, electrical resistance can be reduced and mechanical rigidity can be improved.

Also, in the battery module according to the present invention, a nut is fastened to the auxiliary connection member to install the bus bar at the auxiliary connection member. Therefore, the bus bar is tightly attached to the electrode terminal, improving the mechanical strength of the auxiliary connection member. Thus, the fastening force of the nut can be drastically increased compared with a structure in the related art, and accordingly an increase in the contact resistance can be prevented and stable output electric current can be maintained.

In addition, because the flange portion of the auxiliary connection member is caught by the inner surface of the head portion and the pressing member is installed at the connection shaft portion, the pressing member and the flange portion press the bus bar toward the head portion, and thus the contact between the bus bar the electrode terminal becomes stable.

Because the side openings are formed at both sides of the head portion that face each other and the upper opening and the cutout portion are formed at the upper surface, dividing the upper surface into two parts, the head portion can be elastically deformed so as to be easily tightly attached to the flange portion and the bus bar.

Because the head portion has such a structure that both sides or three sides thereof are open, the inner surface of the head portion can be easily in contact with a cooling medium, thereby easily releasing heat generated from the electrode terminal and reducing the material, production unit cost can be reduced.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like numbers refer to like elements throughout the specification and drawings.

Figure 1:
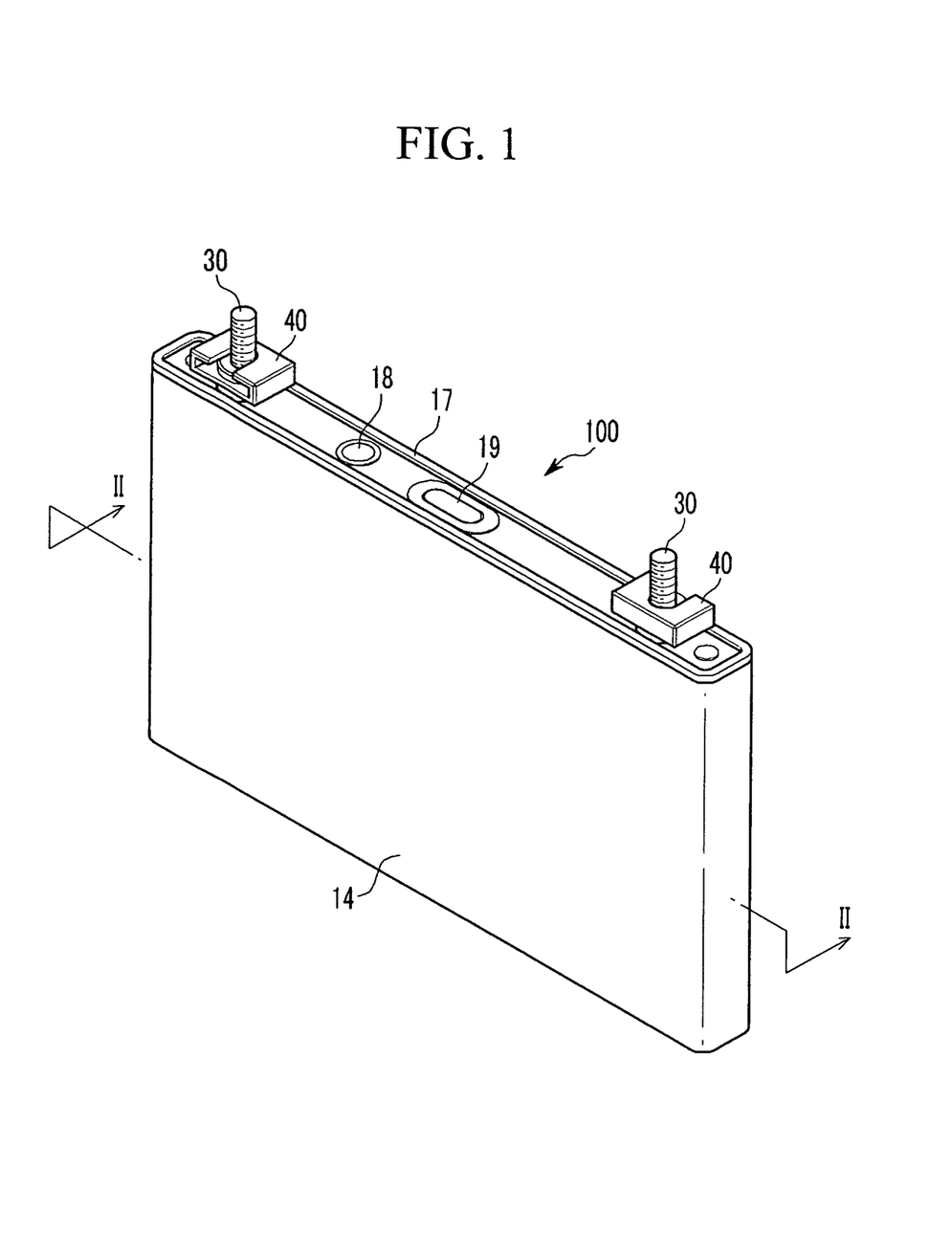
FIG. 1 is a perspective view showing a rechargeable battery according to a first exemplary embodiment of the present invention.
Figure 2:
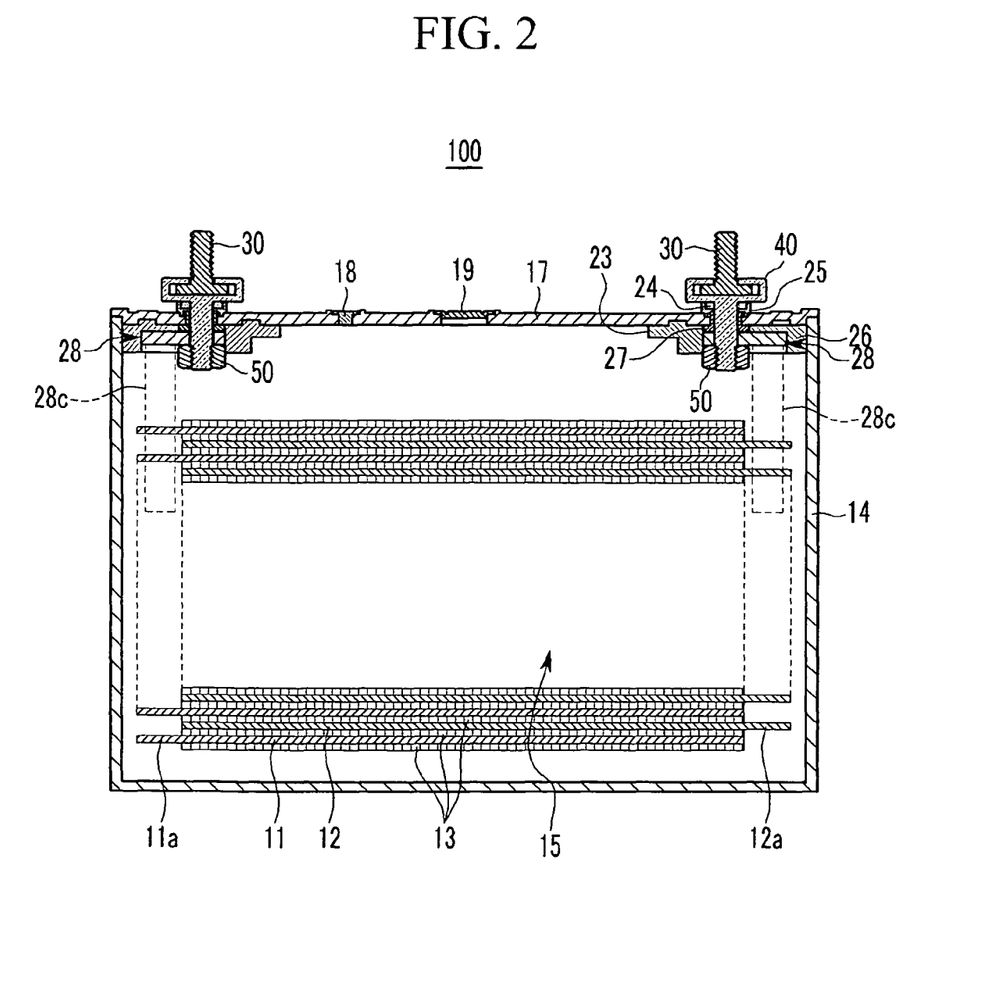
FIG. 2 is a cross-sectional view taken along line II-II in FIG. 1.
Figure 3:
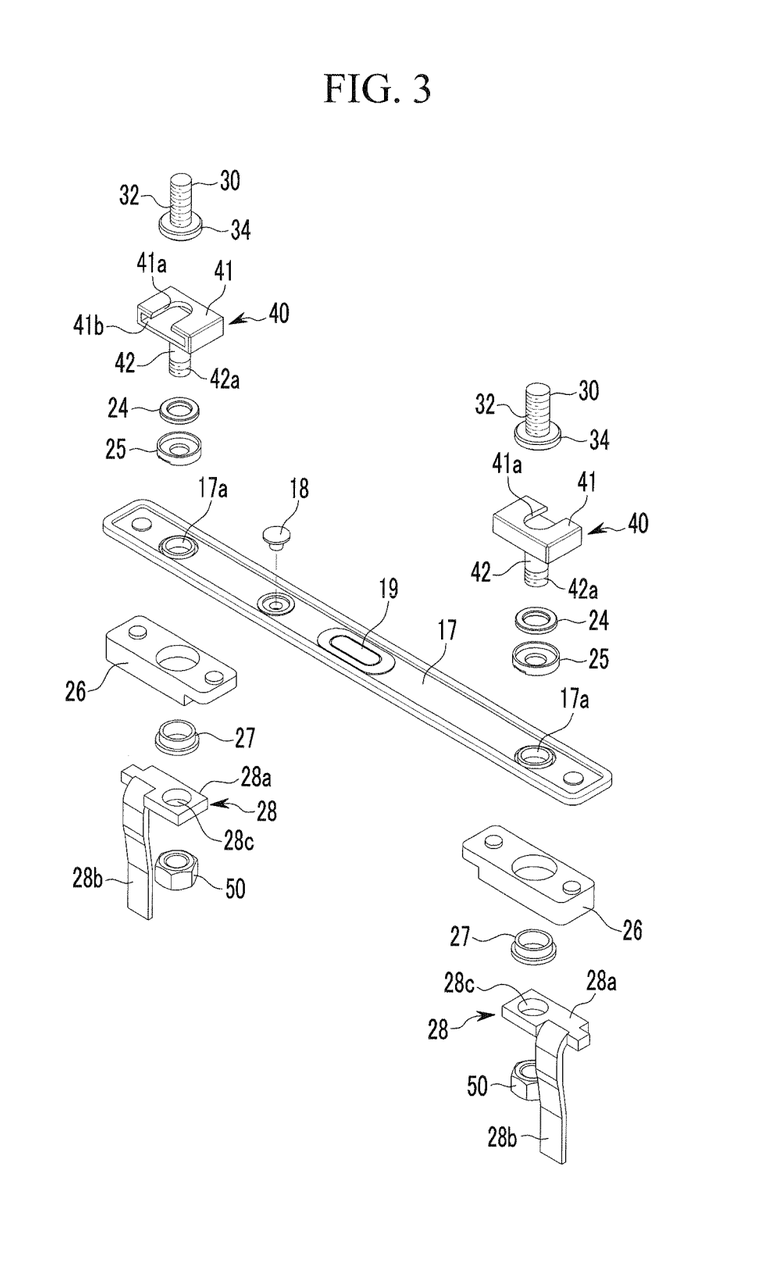
FIG. 3 is an exploded perspective view showing separated members to be fastened to a cap plate in FIG. 1.

FIG. 1 is a perspective view showing a rechargeable battery according to a first exemplary embodiment of the present invention, FIG. 2 is a cross-sectional view taken along line II-II in FIG. 1, and FIG. 3 is an exploded perspective view showing separated members to be fastened to a cap plate in FIG. 1.

With reference to FIGS. 1 to 3, a rechargeable battery 100 includes an electrode group 15 formed by winding a stack of a positive electrode 11, a negative electrode 12, and a separator 13. The separator 13 is an insulating layer interposed between the positive electrode 11 and the negative electrode 12. The rechargeable battery 100 further includes a case 14 for housing the electrode group 15, an electrode terminal 40 electrically connected with the electrode group 15, and a cap plate 17 combined with an opening formed on the case.

The positive electrode 11 and the negative electrode 12 include a coated region where an active material is coated on a current collector formed as a thin plate metal foil and uncoated regions 11a and 12a where no active material is coated. The uncoated regions 11a and 12a are formed at the side ends of the positive electrode 11 and the negative electrode 12, respectively, along a lengthwise direction of the positive electrode 11 and the negative electrode 12. The uncoated regions 11a and 12a can be referred to as electrode tabs. The positive electrode 11 and the negative electrode 12 are wound with the separator 13 interposed therebetween to form the electrode group 15 in a jelly roll form.

In the present exemplary embodiment, an angular rechargeable battery 100 in a jelly roll form is illustrated, but the present invention is not limited thereto and may be applicable to any rechargeable batteries in various shapes including a cylindrical shape.

The electrode terminal 40 is electrically connected with the uncoated portion 11a or 12a of the electrode group 15 by the means of a lead member 28. FIGS. 1 and 2 shows two electrode terminals 40. In this case, one electrode terminal can be connected to one uncoated portion 11a, while the other electrode terminal can be connected to the other uncoated portion 12a.

The cap plate 17 is formed as a thin plate. On the cap plate 17, there are formed a terminal hole 17a into which a part of the electrode terminal 40 is inserted, and an electrolyte injection hole (a hole below a sealing stopper 18) through which an electrolyte is injected into the case 14. A sealing stopper 18 is installed at the electrolyte injection hole. A vent portion 19, having grooves that are to be broken according to a pre-set internal pressure, is installed on the cap plate 17.

A portion of the electrode terminal 40 is inserted into the case 14 via the terminal hole 17a formed on the cap plate 17. Upper and lower gaskets 25 and 27 are interposed between the cap plate 17 and the electrode terminal 40 to insulate the cap plate 17 from the electrode terminal 40.

The lower gasket 27 is inserted inside the terminal hole 17a, and the upper gasket 25 is installed on the cap plate 17. A washer 24 is installed on the upper gasket 25 to buffer a fastening force.

An insulating member 26 is installed under the cap plate 17 to insulate the electrode terminal 40 and the lead member 28 from the cap plate 17. The insulating member 26 includes a hole to which a portion of the electrode terminal 40 and the lower gasket 27 are inserted.

The lead member 28 is installed under the lower gasket 27. The lead member 28 includes an upper plate 28a and an attachment plate 28b protruding downwardly from the upper plate 28a and fixed to one of the uncoated regions 11a and 12a of the electrode group 15. The upper plate 28a includes a hole 28c to which the electrode terminal 40 is inserted.

The electrode terminal 40 includes a head portion 41 positioned on the cap plate 17 and caught on the cap plate, and a support shaft portion 42 protruding downwardly from the head portion 41 and inserted into the terminal hole 17a.

The head portion 41 has a substantially hexahedron shape with an internal space, and includes an upper opening 41a and a side opening 41b. The side opening 41b is formed at one side surface of the head portion 41, and the upper opening 41a is formed at an upper surface of the head portion 41. One side of the upper opening 41a has a cutout that connects the upper opening 41a to the side opening 41b. Therefore, the upper opening 41a is continuously connected with the side opening 41b. The other side of the upper opening 41a has no cutout, and is formed in a rounded shape.

An auxiliary connection member 30 is mechanically coupled to the electrode terminal 40, specifically to the head portion 41. The auxiliary connection member 30 includes a flange portion 34 inserted inside a space of the head portion 41 and a connection shaft portion 32 protruding from the flange portion 34. The flange portion 34 is formed to have a substantially circular cross-section, but the present invention is not limited thereto and the flange portion 34 may be formed to have cross-sections of various shapes such as a quadrangular shape.

The electrode terminal 40 is made of a material such as copper or aluminum, which has higher electric conductivity, and the auxiliary connection member 30 is made of a material such as a steel alloy, which has higher mechanical strength.

The flange portion 34 is inserted into a space of the head portion 41 through the side opening 41b, and the connection shaft portion 32 protrudes upwardly through the upper opening 41a. In this case, the flange portion 34 is tightly attached to an inner surface of the space of the head portion 41 so that the auxiliary connection member 30 cannot be released from the head portion 41. The connection shaft portion 32 has a circular bar shape, and its outer surface is threaded (screw-processed) to allow a nut or the like to be fastened thereto. As described above, the other side of the upper opening 41a is formed in a rounded shape. The shape of the other side of the upper opening 41a is formed to fit the shape of the connection shaft portion 32. Therefore, the connection shaft portion 32 is tightly fixed around the other side of the upper opening 41a that is formed to be rounded, so as to be supported.

A fixing member 50 is installed at the support shaft portion 42 to prevent the electrode terminal 40 from moving. In the present exemplary embodiment, the fixing member 50 is formed as a nut, and the support shaft portion 42 has a threaded face 42a to allow the nut to be easily combined thereto.

The lead member 28 is installed between the fixing member 50 and the lower gasket 27. The lead member 28 may be fixed to the fixing member 50 or the support shaft portion 42 through welding, or may be tightly attached to the fixing member 50 to transfer current to the electrode terminal 40 from the electrode group 15.

When the electrode terminal 40 is fixed by means of the fixing member 50 installed inside the case 14, the fixing member 50 is less affected by an external impact, making the assembly of the electrode terminal 40 more stable. In addition, because the lead member 28 is assembled together with the electrode terminal 40 and the fixing member 50, the assembly of the lead member 28 also can be stable by the fixing member 50. Moreover, because of the stable assembly of the electrode terminal 40 and the lead member 28, an increase in contact resistance between the electrode terminal 40 and the lead member 28 can be prevented.

In addition, because the auxiliary connection member is made of a steel alloy with higher mechanical strength, the auxiliary connection member can sustain the stronger fastening pressure or force, which can be applied to the auxiliary connection member.

Figure 4:
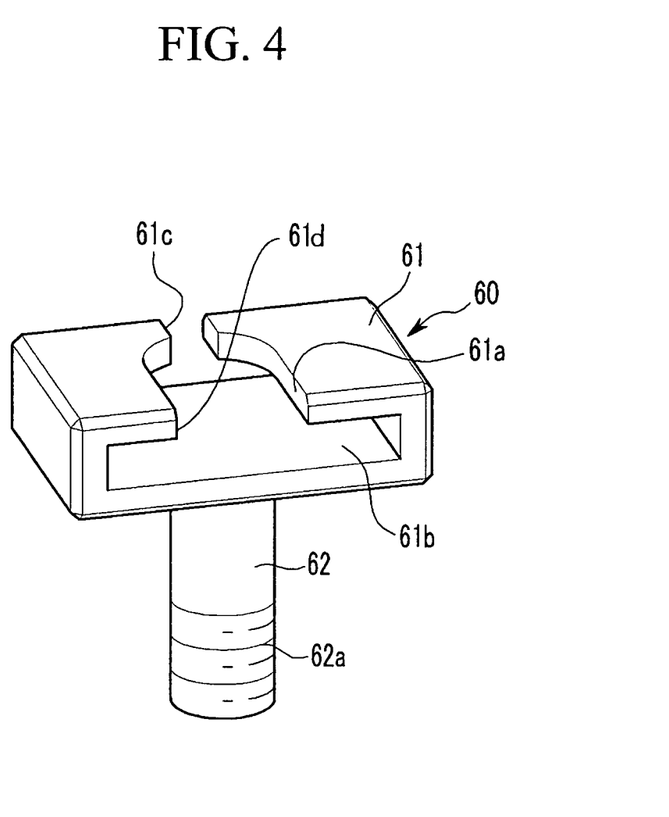
FIG. 4 is a perspective view of an electrode terminal according to a second exemplary embodiment of the present invention.
Figure 5:
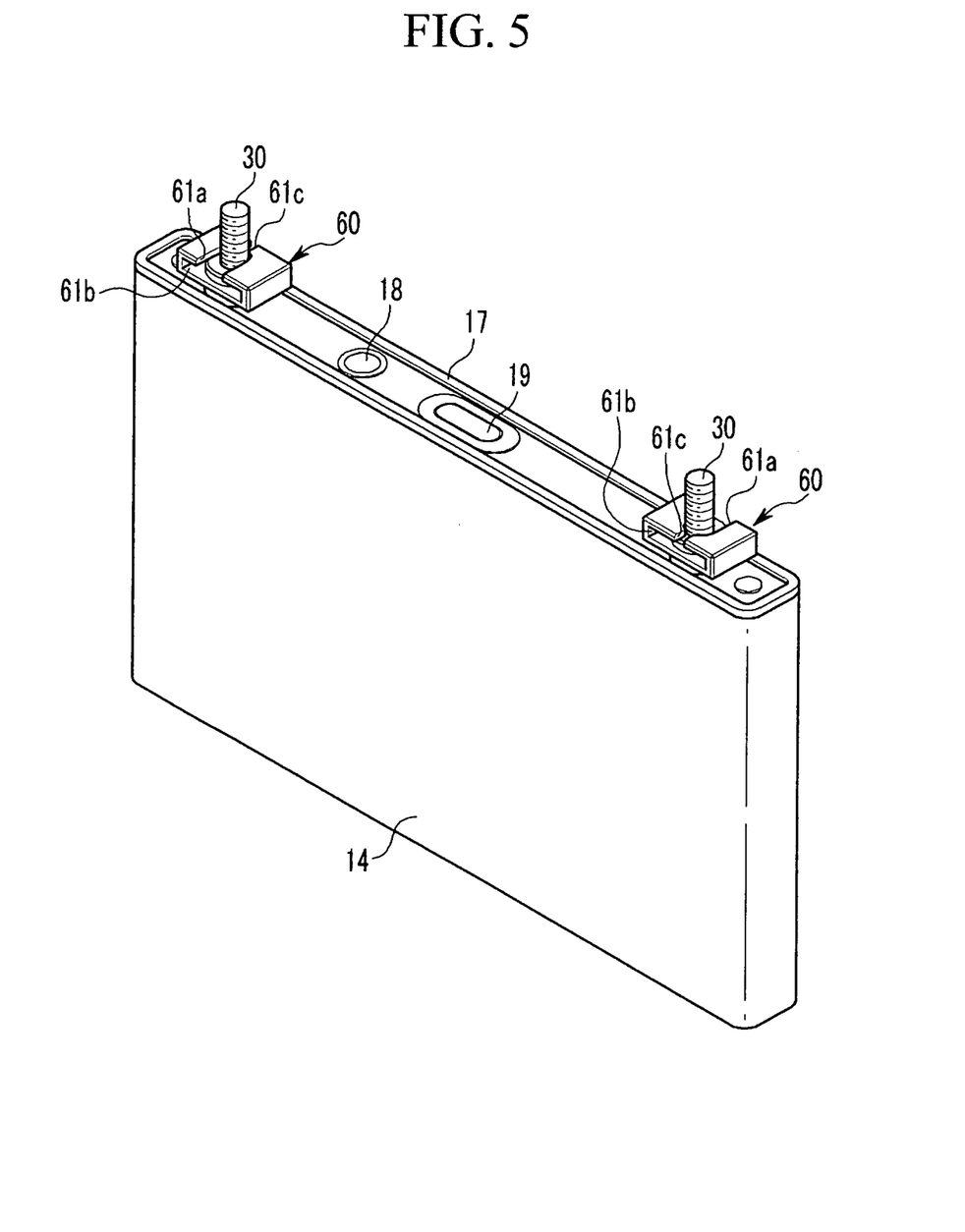
FIG. 5 is a perspective view of the rechargeable battery according to the second exemplary embodiment of the present invention.

FIG. 4 is a perspective view of an electrode terminal according to a second exemplary embodiment of the present invention, and FIG. 5 is a perspective view of the rechargeable battery according to the second exemplary embodiment of the present invention.

The rechargeable battery according to the second exemplary embodiment has the same structure as that of the first exemplary embodiment, except for the electrode terminal, so repeated descriptions for the same structures will be omitted.

With reference to FIGS. 4 and 5, an electrode terminal 60 according to the present exemplary embodiment includes a head portion 61 installed on the cap plate 17 and a support shaft portion 62 protruding downwardly from the head portion 61. The head portion 61 has an internal space to allow the auxiliary connection member 30 to be installed therein, and includes a side opening 61b formed at the side surface, and an upper opening 61a formed on its upper surface.

The side opening 61b is formed at both facing side surfaces of the head portion 61. In other words, a first side surface of the head portion has a first side opening into the space, and a second side surface of the head portion has a second side opening into the space. The first side opening is connected to the upper opening via a first cutout portion 61d, and the second side opening is connected to the upper opening via a second cutout portion 61c. As shown in FIG. 4, the size of the first cutout 61d is greater than the size of the second cutout 61c. The first cutout may be as wide as the thickness of a connection shaft portion of an auxiliary connection member. While a first side of the upper opening 61a is continuously connected with the first side opening, a second side of the upper opening 61a is formed to be rounded to hold the connection shaft portion and is connected with the second side opening via a second cutout portion 61c.

The support shaft portion 62 includes a threaded face 62a to allow a fixing member such as a nut or the like to be combined thereto.

Because the side opening 61b is formed at both surfaces of the head portion 61, the weight of the head portion 61 can be reduced, resulting in reducing the overall weight of the rechargeable battery, and in addition, the material can be also reduced to improve productivity. In addition, with the second cutout portion 61c, when the pressing member such as a nut or the like is combined to the auxiliary connection member 30, the head portion 61 can be elastically deformed and tightly attached in a large area to the connection plate or the like, reducing contact resistance. In addition, because the electrode terminal 60 is easily in contact with a cooling medium, heat transferred to the electrode terminal can be easily released.

Figure 6:
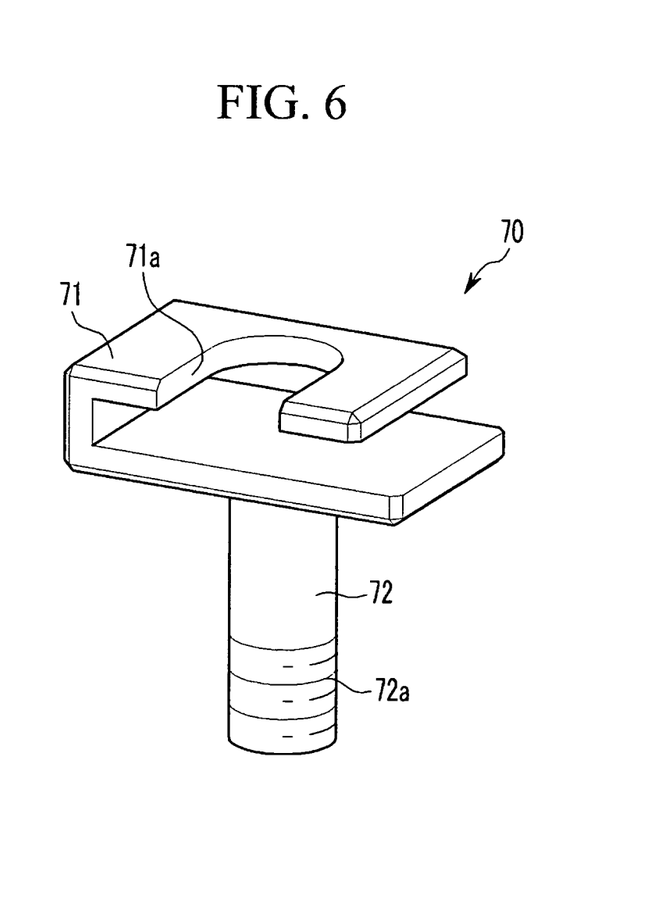
FIG. 6 is a perspective view of the electrode terminal according to a third exemplary embodiment of the present invention.
Figure 7:
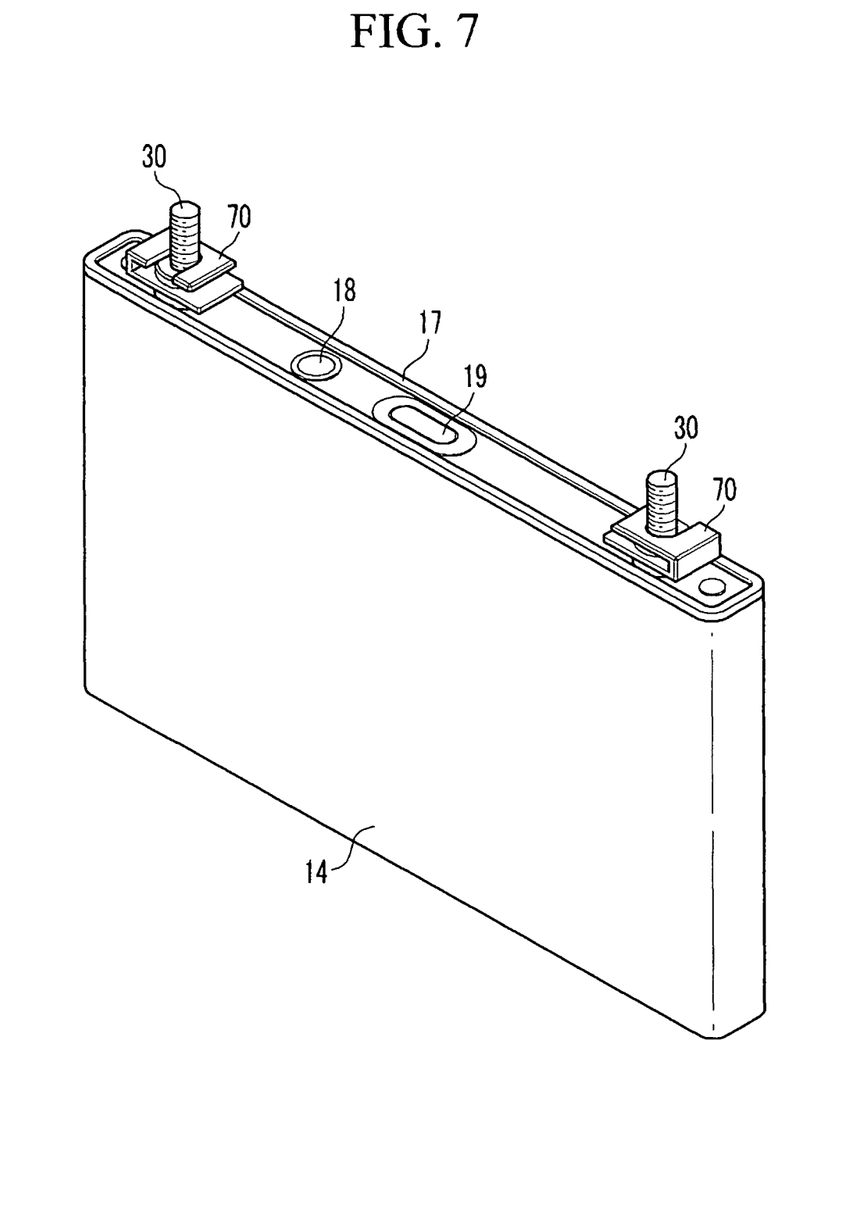
FIG. 7 is a perspective view of the rechargeable battery according to the third exemplary embodiment of the present invention.

FIG. 6 is a perspective view of the electrode terminal according to a third exemplary embodiment of the present invention, and FIG. 7 is a perspective view of the rechargeable battery according to the third exemplary embodiment of the present invention.

The rechargeable battery according to the third exemplary embodiment of the present invention has the same structure as that of the first exemplary embodiment, except for the electrode terminal, so repeated descriptions for the same structures will be omitted.

With reference to FIGS. 6 and 7, an electrode terminal 70 according to the third exemplary embodiment of the present invention includes a head portion 71 installed on the cap plate 17 and a support shaft portion 72 protruding downwardly from the head portion 71. The head portion 71 has an internal space to allow the auxiliary connection member 30 to be installed therein, and three side surfaces of the head portion 71 have side openings. The side openings of formed on the side surfaces of the head portion can be referred to as a first, second, and third side openings. As shown in FIG. 6, the side openings are all connected, and are open to have a substantially channel shape.

An upper opening 71a is formed on the upper surface of the head portion 71 to allow the connection member 30 to be inserted therein. One side of the upper opening has a cutout that connects the upper opening 71a to one of the side openings. The one side of the upper opening is formed to be continuously connected to the one of the side openings, and the other side of the upper opening is formed in a rounded shape and has no cutout.

A support shaft portion 72 includes a threaded face 72a to allow a fixing member such as a nut to be combined thereto.

Because the head portion 71 is formed with the three side surfaces open, the weight of the head portion 71 can be reduced reducing the overall weight and an amount of material of the rechargeable battery. Thus the productivity can be improved. In addition, when the pressing member such as the nut is combined, the head portion 71 can be elastically deformed so as to be tightly attached in a large area to the connection plate or the like, and thus contact resistance can be reduced. Also, because the electrode terminal 70 is easily in contact with a cooling medium, heat transferred to the electrode terminal can be easily released.

Figure 8:
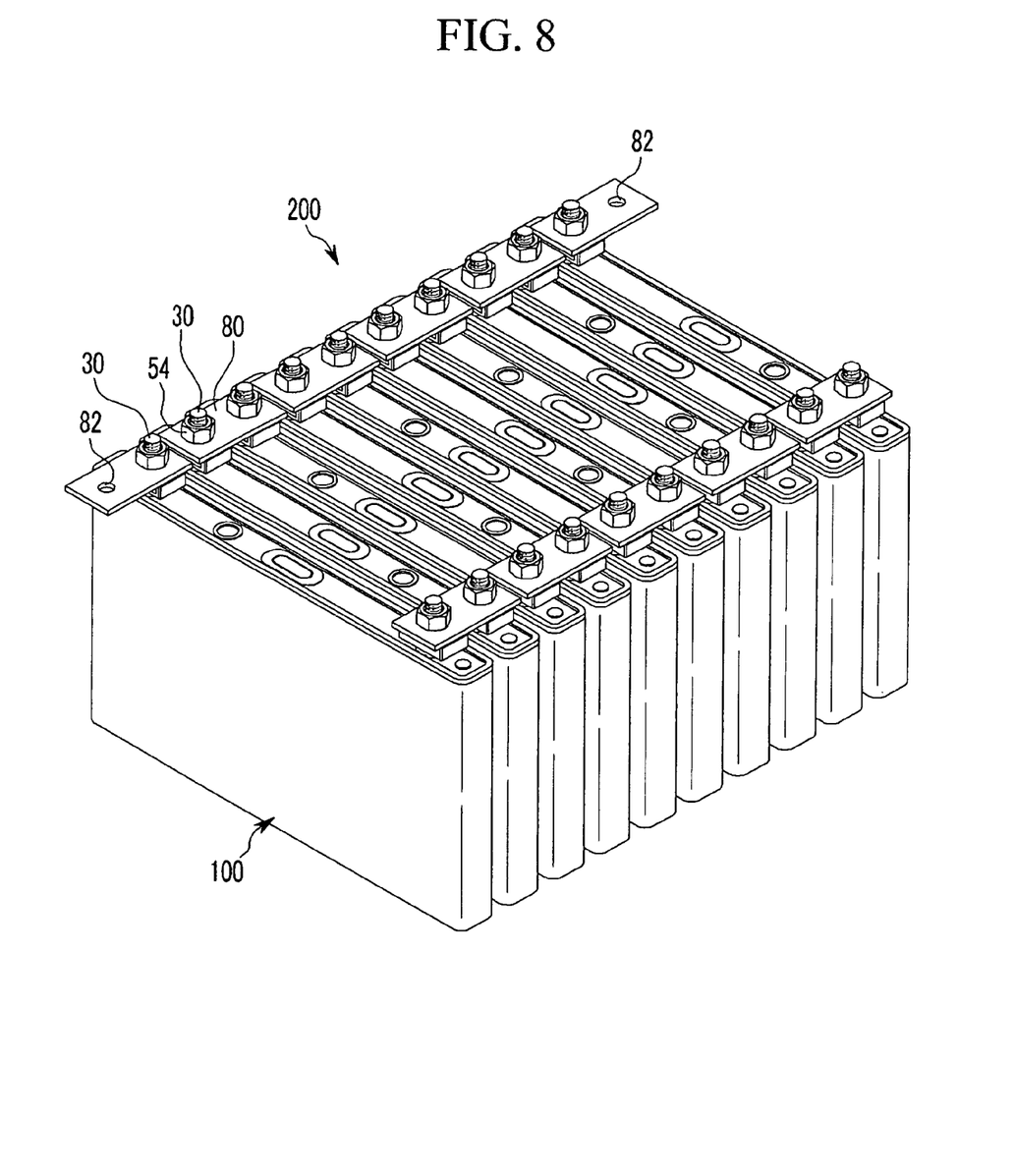
FIG. 8 is a perspective view of a battery module according to a fourth exemplary embodiment of the present invention.

FIG. 8 is a perspective view of a battery module according to a fourth exemplary embodiment of the present invention.

With reference to FIG. 8, a battery module 200 according to the fourth exemplary embodiment of the present invention is configured by electrically connecting the rechargeable batteries 100 of the first exemplary embodiment of the present invention by the medium of bus bars 80.

Two electrode terminals 40 are formed on each of the rechargeable batteries 100. One of the electrode terminals 40 is a positive electrode terminal electrically connected with a positive electrode uncoated region (or a positive electrode tab). The other electrode terminal is a negative electrode terminal electrically connected with a negative electrode uncoated region (or a negative electrode tab). The rechargeable batteries 100 are disposed such that the electrode terminals 40 connecting neighboring rechargeable batteries have opposite polarities. That is, the rechargeable batteries 100 are disposed such that the negative electrode terminal of one rechargeable battery 100 is disposed to be adjacent to the positive electrode terminal of another rechargeable battery 100 neighboring thereto, and the positive electrode terminal of the another rechargeable battery and the negative electrode terminal of the one rechargeable battery are connected by the bus bar 80.

The bus bar 80 has two holes 82, through which the connection shaft portion 32 of the auxiliary connection member 30 installed at the neighboring rechargeable battery 100 penetrates. The pressing member 54 combined with the connection shaft portion 32 is installed on the bus bar 80 to tightly attach the bus bar 80 to the upper surface of the head portion 41 of the electrode terminal 40. In the present exemplary embodiment, the pressing member 54 is formed as a nut. The nut is combined to the threaded face of the connection shaft portion 32 of the auxiliary connection member 30 to press the bus bar 80 to the electrode terminal 40.

When the bus bar 80 is tightly attached to the head portion 41 by means of the pressing member 54, contact resistance between the bus bar 80 and the head portion 41 reduces, and as a result, the electric current flow between neighboring rechargeable batteries becomes stable. In addition, because the auxiliary connection member 30 is made of a material with higher mechanical strength, the pressing member 54 can be more tightly fastened to the auxiliary connection member 30

In the present exemplary embodiment, the bus bar 80 is tightly attached to the electrode terminal 40 by using the pressing member 54 to electrically connect the bus bar 80 and the electrode terminal 40, but the present invention is not limited thereto. The bus bar 80 may be directly joined to the electrode terminal 40 through welding, and in this case, the auxiliary connection member 30 may be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode group comprising a positive electrode, a negative electrode, and a separator disposed between the positive electrode and the negative electrode;
   a case for housing the electrode group;
   a cap plate combined with the case;
   an electrode terminal electrically coupled to the electrode group, the electrode terminal comprising:
      a head portion disposed outside the case; and
      a support shaft portion protruding from the head portion and penetrating the cap plate;
   a fixing member disposed inside the case and combined to the support shaft portion; and
   an auxiliary connection member mechanically coupled to the head portion of the electrode terminal, the auxiliary connection member comprising:
      a flange portion; and
      a connection shaft portion protruding from the flange portion.

2. The rechargeable battery of claim 1, wherein the support shaft portion comprises a threaded face, and the fixing member includes a nut.

3. The rechargeable battery of claim 1, wherein the cap plate has a terminal hole, and the support shaft portion is being inserted into the terminal hole.

4. The rechargeable battery of claim 1, wherein the head portion includes a space inside the head portion, a side surface of the head portion having a side opening into the space, an upper surface of the head portion having an upper opening into the space.

5. The rechargeable battery of claim 4, wherein the flange portion is disposed inside the space of the head portion, the connection shaft portion protruding out of the head portion through the upper opening.

6. The rechargeable battery of claim 5, wherein one side of the upper opening has a cutout connecting the upper opening to the side opening, and another side of the upper opening is formed to fit the connection shaft portion.

7. The rechargeable battery of claim 1, wherein the head portion has a space inside the head portion, an upper surface of the head portion having an upper opening into the space, a first side surface of the head portion having a first side opening into the space, a second side surface of the head portion having a second side opening into the space, a first side of the upper opening having a first cutout connecting the upper opening to the first side opening, a second side of the upper opening having a second cutout connecting the upper opening to the second side opening, a size of the first cutout being greater than a size of the second cutout.

8. The rechargeable battery of claim 1, wherein the head portion has a space inside the head portion, an upper surface of the head portion having an upper opening into the space, a first side surface of the head portion having a first side opening into the space, a second side surface of the head portion having a second side opening into the space, a third side of the head portion having a third side opening into the space, a first side of the upper opening having a cutout connecting the upper opening to the first side opening.

9. The rechargeable battery of claim 1, wherein the auxiliary connection member has greater mechanical strength than the electrode terminal.

10. The rechargeable battery of claim 1, wherein an outer surface of the connection shaft portion has a threaded face that is combined with a nut.

11. The rechargeable battery of claim 1, further comprising:
    a gasket disposed between the cap plate and the support shaft portion to insulate the electrode terminal from the cap plate;
    a lead member disposed between the cap plate and the fixing member, the lead member connecting an electrode tab of the electrode group to the electrode terminal; and
    an insulating member disposed between the cap plate and the lead member to insulate the lead member from the cap plate.

12. A battery module comprising:
    a plurality of rechargeable batteries; and
    a bus bar electrically connecting at least two of the rechargeable batteries, each of the rechargeable batteries comprising:
       a case for housing an electrode group that produces electricity;
       a cap plate combined with the case;
       an electrode terminal electrically coupled to the electrode group, the electrode terminal comprising:
          a head portion disposed outside the case; and
          a support shaft portion protruding from the head portion and penetrating the cap plate;
       a fixing member disposed inside the case and combined to the support shaft portion; and
       an auxiliary connection member mechanically coupled to the head portion of the electrode terminal, the auxiliary connection member comprising:

a flange portion; and
a connection shaft portion protruding from the flange portion.

13. The battery module of claim 12, wherein the connection shaft portion penetrating the bus bar, and the battery module further comprising:
a pressing member installed to the connection shaft portion to tightly attach the bus bar to the electrode terminal.

14. The battery module of claim 13, wherein an outer surface of the connection shaft portion has a threaded face, and the pressing member includes a nut.

15. The battery module of claim 12, wherein the bus bar is fixed to the head portion of the electrode terminal through welding.

16. The battery module of claim 12, wherein the support shaft portion comprises a threaded face, and the fixing member includes a nut.

17. The battery module of claim 12, wherein the cap plate has a terminal hole, and the support shaft portion is being inserted into the terminal hole.

18. The battery module of claim 12, wherein the head portion has a space inside the head portion, a side surface of the head portion having a side opening into the space, an upper surface of the head portion having an upper opening into the space.

19. The battery module of claim 18, wherein the flange portion is disposed inside the space of the head portion, the connection shaft portion protruding out of the head portion through the upper opening.

20. The battery module of claim 19, wherein one side of the upper opening has a cutout connecting the upper opening to the side opening, and another side of the upper opening is formed to fit the connection shaft portion.

21. The battery module of claim 12, wherein the head portion has a space inside the head portion, an upper surface of the head portion having an upper opening into the space, a first side surface of the head portion having a first side opening into the space, a second side surface of the head portion having a second side opening into the space, the first side opening facing the second side opening.

22. The battery module of claim 21, wherein a first side of the upper opening having a first cutout connecting the upper opening to the first side opening, a second side of the upper opening having a second cutout connecting the upper opening to the second side opening, a size of the first cutout being greater than a size of the second cutout.

23. The battery module of claim 12, wherein the head portion has a space inside the head portion, an upper surface of the head portion having an upper opening into the space, The head portion having at least three side openings formed at side surfaces of the head portion, the at least three side openings being connected.

24. The battery module of claim 12, wherein the auxiliary connection member has greater mechanical strength than the electrode terminal.

* * * * *